United States Patent
Ellington et al.

(10) Patent No.: US 8,084,550 B2
(45) Date of Patent: *Dec. 27, 2011

(54) LOW GLOSS THERMOPLASTIC COMPOSITION

(75) Inventors: Donald Howard Ellington, Evansville, IN (US); Kenneth Frederick Miller, Mt. Vernon, IN (US); Yantao Zhu, Evansville, IN (US); Claire Qing Yu, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 13 days.

This patent is subject to a terminal disclaimer.

(21) Appl. No.: 11/316,227

(22) Filed: Dec. 22, 2005

(65) Prior Publication Data

US 2006/0264579 A1 Nov. 23, 2006

Related U.S. Application Data

(60) Provisional application No. 60/683,826, filed on May 23, 2005.

(51) Int. Cl.
*C08G 59/00* (2006.01)
*C08L 69/00* (2006.01)

(52) U.S. Cl. ..................... 525/438; 525/439

(58) Field of Classification Search ............. 525/438, 525/439
See application file for complete search history.

(56) References Cited

U.S. PATENT DOCUMENTS

| | | | |
|---|---|---|---|
| 2,465,319 A | 3/1949 | Whinfeld | |
| 2,720,502 A | 10/1955 | Caldwell | |
| 2,727,881 A | 12/1955 | Caldwell et al. | |
| 2,822,348 A | 2/1958 | Haslam | |
| 2,999,835 A | 9/1961 | Goldberg | |
| 3,038,365 A | 6/1962 | Peterson | |
| 3,047,539 A | 7/1962 | Pengilly | |
| 3,153,008 A | 10/1964 | Fox | |
| 3,224,043 A | 12/1965 | Lameris | |
| 3,302,243 A | 2/1967 | Ludwig | |
| 3,334,154 A | 8/1967 | Kim | |
| 3,635,895 A | 1/1972 | Kramer | |
| 3,671,487 A | 6/1972 | Abolins | |
| 3,915,608 A | 10/1975 | Hujik | |
| 3,953,394 A | 4/1976 | Fox et al. | |
| 4,001,184 A | 1/1977 | Scott | |
| 4,123,436 A | 10/1978 | Holub et al. | |
| 4,128,526 A | 12/1978 | Borman | |
| 4,131,575 A | 12/1978 | Adelmann et al. | |
| 4,204,047 A | 5/1980 | Margotte et al. | |
| 5,001,178 A | 3/1991 | Jalbert et al. | |
| 5,021,508 A | 6/1991 | Taubitz et al. | |
| 5,087,663 A | 2/1992 | Laughner | |
| 5,196,479 A | 3/1993 | Laughner et al. | |
| 5,369,154 A | 11/1994 | Laughner | |
| 5,508,344 A | 4/1996 | Mason et al. | |
| 5,648,411 A * | 7/1997 | Gallucci et al. | 524/156 |
| 6,174,943 B1 | 1/2001 | Matsumoto et al. | |
| 6,541,550 B1 * | 4/2003 | McCarthy et al. | 524/195 |
| 6,583,256 B2 | 6/2003 | Vollenberg et al. | |
| 2004/0059079 A1 | 3/2004 | Vilasagar et al. | |
| 2004/0077768 A1 * | 4/2004 | Greenwood | 524/492 |

FOREIGN PATENT DOCUMENTS

| | | |
|---|---|---|
| EP | 0 519 098 A1 | 12/1992 |
| EP | 0 829 517 A1 | 3/1998 |
| JP | 10-168297 | 6/1998 |
| JP | 10168297 | 6/1998 |
| JP | XP002397729 | 6/1998 |
| JP | 11-116782 | 4/1999 |
| JP | 11116782 | 4/1999 |
| JP | XP002397731 | 4/1999 |
| JP | 2001123042 | 5/2001 |
| JP | XP02397730 | 5/2001 |
| JP | 2001-123042 | 8/2001 |
| JP | 2004137396 | 5/2004 |
| WO | WO92/14787 | 3/1992 |
| WO | WO93/19128 | 9/1993 |
| WO | WO98/23684 | 6/1998 |
| WO | WO 2004020523 A1 * | 3/2004 |
| WO | WO2005/071012 | 8/2005 |

OTHER PUBLICATIONS

ASTM Designation: D523-89, Standard Test Method for Specular Glass, pp. 1-5, 1989.
European Patent Office, International Search Report: International Application No. PCT/US2006/020956, Date of Mailing: Sep. 15, 2006.
International Standard, "Plastics—Determination of the fluidity of plastics using capillary and slit-die rheometers", ISO 11443, Second edition, Mar. 1, 2005, pp. 1-35.
International Standard, "Paints and varnishes—Determination of specular gloss of non-metallic paint films at 20, 60 and 85 degrees", ISO 2813:1994, Technical Corrigendum 1, published Feb. 15, 1997, pp. 1-2.

* cited by examiner

*Primary Examiner* — Mark Eashoo
*Assistant Examiner* — Megan McCulley
(74) *Attorney, Agent, or Firm* — Cantor Colburn LLP; Diderico van Eyl

(57) ABSTRACT

A composition comprising a) about 30 to 80 wt. % of a polycarbonate, b) about 5 to about 50 wt. % of a polyester, c) about 2 to about 25 wt. % of an impact modifier and d) a gloss reducing effective amount of a multifunctional additive comprising at least one epoxy group.

58 Claims, No Drawings

LOW GLOSS THERMOPLASTIC COMPOSITION

CROSS REFERENCE TO RELATED APPLICATIONS

This application claims priority to U.S. Provisional Application Ser. No. 60/683,826 filed on May 23, 2005, which is incorporated herein by reference in its entirety.

BACKGROUND OF THE INVENTION

Plastics have been replacing metals and other material products in industry for many years. This is particularly true with respect to automotive parts. The lighter weight of plastics and their flexibility in structural design provide significant motivation to designers and engineers to use plastics. One of the areas in which plastics are contemplated being employed is where paint elimination in a molded part is desirable. However, the look of paint, that is the exterior surface being of low gloss, is also desired. Most plastic materials produce high gloss surfaces when molded. Achieving that low gloss while maintaining the required structural, mechanical, dimensional, chemical resistance, and the like characteristics of the molded part, is difficult to achieve. Of course such desired molded parts are not restricted to automotive use but can be employed in machine housings, appliances, consumer or electronic devices, and outdoor vehicles and devices and any other part needing good mechanical strength and low gloss.

We have succeeded in designing a material that produces a low gloss molded part that satisfies the requirements of its intended use. The look of paint is matched but the advantages of plastic are achieved particularly with respect to performance in higher-heat environments and good mechanical properties. Certain multiple component plastic compositions can be used. Certain additives also enhance the reduction of gloss. Molding conditions can also result in gloss reduction. We have also succeeded in reducing the gloss of an article molded from certain compositions by heating the article under certain conditions. These significant gloss reductions can be achieved even when molding against a polished tool. Substantially uniform low gloss to totally uniform low gloss can be achieved over the molded part surface. The composition can also be readily molded, the viscosity varying according to the requirements of the part to be molded. For example, viscosities below about 500 Pa-s at 271° C. as measured by capillary rheometry following the ISO 11443 standard can be achieved, particularly when large and/or intricate parts are desired.

SUMMARY OF THE INVENTION

In accordance with the invention, there is a composition comprising
  a. A polycarbonate (PC) from about 30 to about 80 wt. % of the composition,
  b. A polyester, from about 5 to about 50 wt. % of the composition, such that when polybutylene terephthalate is present in the composition, the polybutylene terephthalate is present in conjunction with at least one other polyester that is not polybutylene terephthalate.
  c. An impact modifier from about 2 to about 25 wt. % of the composition, and
  d. A gloss reducing effective amount of a multifunctional additive comprising at least one epoxy group.

Molding conditions can also bring about a reduction in gloss. Good color and low gloss uniformity are hard to obtain at the same time. The compositions accomplish these goals, while maintaining good dimensional stability at high temperature and good mechanical properties. A relatively low viscosity can be achieved which is particularly desirable when molding large or intricate parts, such as those found in automotive applications.

Additionally there is a method for reducing the gloss of an article molded from a composition having at least one aromatic polycarbonate and at least one polyester comprising adding to said composition a gloss reducing effective amount of a multifunctional additive comprising at least one epoxy group, e.g., an epoxy silane or a glycidyl methacrylate modified polyolefin.

Still further, gloss is reduced by lowering the quantity of polybutylene terephthalate (PBT) in a composition.

Additionally, gloss is reduced by increasing the quantity of polyethylene terephthalate (PET) in a composition.

Still further is a composition of a, b, c, and d where at least 5 wt % of the multifunctional additive has reacted with a component of the composition.

Still further, there is a process wherein a, b, c, and d are combined under reactive conditions.

DETAILED DESCRIPTION OF THE INVENTION

The invention is based on the remarkable discovery that it is now possible to produce a molding composition containing polycarbonate and polyester having unexpected low gloss. Articles made from these compositions can also exhibit unexpectedly reduced gloss. Articles made from these compositions can also exhibit highly useful physical and thermal properties.

The singular forms "a", "an", and "the" include plural referents unless the context clearly dictates otherwise.

"Optional" or "optionally" as used herein means that the subsequently described event may or may not occur, and that the description includes instances where the event occurs and the instances where it does not occur.

A "multifunctional additive comprising at least one epoxy group" refers to a compound having at least three reactive sites, e.g., epoxy functional groups, a silane having a reactive site.

Aromatic polycarbonates are employed in the composition of this invention. Typically they are prepared by reacting a dihydric phenol with a carbonate precursor. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are: 2,2-bis(4-hydroxyphenyl)propane; hydroquinone; resorcinol; 2,2-bis(4-hydroxyphenyl)pentane; 2,4'-(dihydroxydiphenyl)methane; bis(2-hydroxyphenyl)methane; bis(4-hydroxyphenyl)methane; 1,1-bis(4-hydroxyphenyl)-3,3,5-trimethylcyclohexane; fluorenone bisphenol, 1,1-bis(4-hydroxyphenyl)ethane; 3,3-bis(4-hydroxyphenyl)pentane; 2,2-dihydroxydiphenyl; 2,6-dihydroxynaphthalene; bis(4-hydroxydiphenyl)sulfone; bis(3,5-diethyl-4-hydroxyphenyl) sulfone; 2,2-bis(3,5-dimethyl-4-hydroxyphenyl)propane; 2,4'-dihydroxydiphenyl sulfone; 5'-chloro-2,4'-dihydroxydiphenyl sulfone; bis-(4-hydroxyphenyl)diphenyl sulfone; 4,4'-dihydroxydiphenyl ether; 4,4'-dihydroxy-3,3'-dichlorodiphenyl ether; 4,4-dihydroxy-2,5-diphenyl ether; and the like.

Other dihydric phenols used in the preparation of the above polycarbonates are disclosed in U.S. Pat. Nos. 2,999,835; 3,038,365; 3,334,154; and 4,131,575.

Aromatic polycarbonates can be manufactured by known processes; such as, as mentioned above, by reacting a dihydric phenol with a carbonate precursor, such as phosgene, in accordance with methods set forth in the above-cited literature and in U.S. Pat. No. 4,123,436, or by transesterification processes such as are disclosed in U.S. Pat. No. 3,153,008, as well as other processes known to those skilled in the art.

It is also possible to employ two or more different dihydric phenols or a copolymer of a dihydric phenol with a glycol or with a hydroxy- or acid-terminated polyester or with a dibasic acid in the event a carbonate copolymer or interpolymer rather than a homopolymer is desired for use in the preparation of the polycarbonate mixtures of the invention. Branched polycarbonates are also useful, such as are described in U.S. Pat. No. 4,001,184. Also, there can be utilized blends of linear polycarbonate and a branched polycarbonate. Moreover, blends of any of the above materials may be employed in the practice of this invention to provide the aromatic polycarbonate.

One aromatic carbonate is a homopolymer, e.g., a homopolymer derived from 2,2-bis(4-hydroxyphenyl)propane (bisphenol-A) and phosgene, commercially available under the trade designation LEXAN® from General Electric Company.

Branched polycarbonates are prepared by adding a branching agent during polymerization. These branching agents are well known and may comprise polyfunctional organic compounds containing at least three functional groups which may be hydroxyl, carboxyl, carboxylic anhydride, haloformyl and mixtures thereof. Specific examples include trimellitic acid, trimellitic anhydride, trimellitic trichloride, tris-p-hydroxy phenyl ethane, isatin-bis-phenol, tris-phenol TC (1,3,5-tris ((p-hydroxyphenyl)isopropyl)benzene), tris-phenol PA (4-(4-(1,1-bis(p-hydroxyphenyl)-ethyl)alpha, alpha-dimethyl benzyl)phenol), 4-chloroformyl phthalic anhydride, trimesic acid and benzophenone tetracarboxylic acid. The branching agent may be added at a level of about 0.05-2.0 weight percent. Branching agents and procedures for making branched polycarbonates are described in U.S. Pat. Nos. 3,635,895; 4,001,184; and 4,204,047.

Copolyester carbonates are also included within the term polycarbonate. These materials are prepared when a di-functional acid is also included in the preparation, thereby providing ester as well as carbonate bonds in the polymer. For example terephthalic acid and/or isophthalic acid can be used. When tere- and iso-phthtalic acid are present together with resorcinol as well as the usual bisphenol-A and carbonate precursor, a block polyarylate (ester) within the polycarbonate is formed, see U.S. Pat. No. 6,583,256B2 for example.

A preferred molecular weight (Mw) of the above mentioned polycarbonate is from about 25,000 g/mol to about 75,000 g/mol measured methylene dichloride at 25° C. using a polystyrene standard. For blends where higher flow is desired, a preferred Mw is from about 28,000 g/mol to 60,000 g/mol, more preferred about 35,000 g/mol to 45,000 g/mol. All molecular weights in this application are measured by gel permeation chromatography.

The quantity of aromatic polycarbonate employed in the composition is from about 30 to about 80 wt. % of the composition, preferably about 45 to about 75 wt. %.

Suitable polyesters include those comprising structural units of the following formula:

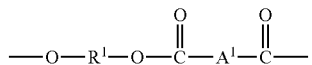

wherein each $R^1$ is independently a divalent aliphatic, alicyclic or aromatic hydrocarbon or polyoxyalkylene radical, or mixtures thereof and each $A^1$ is independently a divalent aliphatic, alicyclic or aromatic radical, or mixtures thereof. Examples of suitable polyesters containing the structure of the above formula are poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometimes desirable to have various concentrations of acid and hydroxyl end groups on the polyester, depending on the ultimate end-use of the composition.

The $R^1$ radical may be, for example, a $C_{2-10}$ alkylene radical, a $C_{6-12}$ alicyclic radical, a $C_{6-20}$ aromatic radical or a polyoxyalkylene radical in which the alkylene groups contain about 2-6 and most often 2 or 4 carbon atoms. The $A^1$ radical in the above formula is most often p- or m-phenylene, a cycloaliphatic or a mixture thereof. This class of polyester includes the poly(alkylene terephthalates). Such polyesters are known in the art as illustrated by the following patents, which are incorporated herein by reference. U.S. Pat. Nos. 2,465,319; 2,720,502; 2,727,881; 2,822,348; 3,047,539; 3,671,487 3,953,394; and 4,128,526.

Examples of aromatic dicarboxylic acids represented by the dicarboxylated residue $A^1$ are isophthalic or terephthalic acid, 1,2-di(p-carboxyphenyl)ethane, 4,4'-dicarboxydiphenyl ether, 4,4' bisbenzoic acid and mixtures thereof. Acids containing fused rings can also be present, such as in 1,4-1,5- or 2,6-naphthalenedicarboxylic acids. The preferred dicarboxylic acids are terephthalic acid, isophthalic acid, naphthalene dicarboxylic acid, cyclohexane dicarboxylic acid or mixtures thereof.

Particularly suitable polyesters are poly(ethylene terephthalate) ("PET"), and poly(1,4-butylene terephthalate), ("PBT"), poly(ethylene naphthanoate) ("PEN"), poly(butylene naphthanoate), ("PBN"), poly(cyclohexanedimethylene terephthalate) ("PCT"), cyclohexanedimethanol modified poly(ethylene terephthalate) also known as polycyclohexylenedimethylene ethylene terephthalate) ("PETG" and "PCTG"), and (polypropylene terephthalate) ("PPT"), and mixtures thereof.

When PBT is present in the composition, the polybutylene terephthalate is used in conjunction with at least one other polyester that is not PBT. In this embodiment, suitable weight ratios of PBT to non-PBT polyesters can range from 9:1 to 1:9. In one embodiment, the polyester component does not include PBT. The above-mentioned numerical ranges, as well as the other numerical ranges disclosed in this specification, are understood to be continuous, they include every value between the minimum and maximum values.

Also contemplated herein are the above polyesters with minor amounts, e.g., from about 0.5 to about 25 percent by weight, of units derived from aliphatic acid and/or aliphatic polyols to form copolyesters. The aliphatic polyols include glycols, such as polytetramethylene glycol or poly(ethylene glycol) or poly(butylene glycol). Such polyesters can be made following the teachings of, for example, U.S. Pat. Nos. 2,465,319 and 3,047,539.

The impact modifier employed in the inventive composition is of a core-shell, grafted, or un-grafted nature, or any other type of impact modifier which exists as a separate phase within the blend matrix as observed by a microscopic technique. These impact modifiers reduce the gloss of the resinous composition without any additive present. Such impact modifiers include, but are not limited to, homopolymers as well as polymers from the copolymerization of more than one monomer.

Examples of such impact modifiers are ABS resins, particularly those having a high butadiene content, such as Blendex ABS resins from Crompton, butadiene styrene, nitrile containing rubbers such as Hycar reactive liquid polymers from Noveon Specialty Chemical. Methylmethacrylate butadiene styrene has been used in the system as well. Silicone containing impact modifiers, such as METABLEN S2001, are available from Mitsubishi Rayon Co., Ltd., Tokyo (Japan). A further impact modifier is a LOTADER® resin, for example LOTADER® AX8900 which is sold by Arkema. The resin is a co- or ter-polymer including units of ethylene and glycidyl methacrylate (GMA). An added advantage of LOTADER® resins is colorfastness after exposure to outdoor or accelerated weathering.

Typical ABS impact modifiers are described in US 2004/0059079A1 entitled Enhanced Polymerization Process dated Mar. 25, 2004. Paragraphs 23 to 68 of this publication are incorporated by reference into the specification of the present application. Preferred ABS modifiers are those with high rubber content, such as Blendex 362, which 62% polybutadiene and Blendex 338 which is 70% polybutadiene.

Additional preferred impact modifiers include MBS type modifiers, available from several sources such as Rohm and Haas., LOTADER type modifiers, and a combination of two or more modifiers.

A specific additive(s) can lower the gloss of the molded composition. The additive is a multifunctional (3 or more reactive groups) agent. At least one of the groups is an epoxy. The second group, if not an epoxy, is a hydroxyl, an isocyanate, a silane, a glycidyl methacrylate modified polyolefin, and the like. Examples of gloss reducing additives are molecules such as a tri-methoxy or tri-ethoxy silane also bearing an epoxy group, for example beta-(3,4-epoxycyclohexyl)ethyl-triethoxysilane, sold as CoatOSil 1770 by GE. Other examples are beta-(3,4-epoxycyclohexyl) ethyltrimethoxysilane, sold as Silquest A-186 by GE and 3-Glycidoxypropyl-triethoxysilane, sold as Silquest Y-15589 by GE. Preferred are epoxy groups in a molecule, such as in Coat-O-Sil 1770.

A further example of a preferred gloss reducing additive is a LOTADER® resin. In addition to the impact modification properties previously noted above, the resin is an effective gloss reducing additive. As noted, multiple epoxy functional groups are present in the polymer.

The quantities of each component are significant and amounts of the materials can affect gloss. Aromatic PC can vary from about 30 to about 80 wt. % of the composition, preferably about 45 to about 75 wt. %. The polyester content is from about 5 to about 50 wt. % of the composition with a more desirable minimum of about 10 wt. %. Generally there is no more than about 45 wt. % for molding applications. If lower viscosity and increased chemical resistance are desired, there should be enough polyester to achieve the desired end properties. The impact modifier is from about 2 to about 25 wt. % of the composition, preferably about 4 to about 20 wt. %. Gloss reduction desired beyond the basic resinous composition is brought about by a minimum amount of gloss reducing additive. The gloss reducing additive(s) can be present in a minimum quantity of about 0.1 wt. % of the composition. When a polymer, such as LOTADER® resin is present in the composition, a desired minimum is about 0.5 wt. %. When a compound, such as an epoxy silane is present in the composition, generally no more than about 5 wt. % is employed. When an epoxy functionalized polymer is present in the composition, such as LOTADER® resin, which has the dual properties of impact modification and gloss reduction, generally no more than about 25 wt. % is employed.

A molding composition of the invention is generally made by combining suitable amounts of the polycarbonate component, the polyester component, the impact modifier, and the multifunctional additive comprising at least one epoxy group in an extruder (or a functionally equivalent compounding device) under suitable conditions. The polycarbonate component, the polyester component, the impact modifier, and the multifunctional additive may be compounded simultaneously, separately, or in combinations containing two or three of the components. The extrusion process can include one or more passes through an extruder.

Accordingly, the invention includes embodiments that encompass reaction products that result when the two or three of the components are compounded separately before being combined with the remaining components of the composition. For instance, in one embodiment, the invention includes a composition that includes a reaction product of (i) a multifunctional additive containing at least one epoxy group and (ii) a polyalkylene terephathalte, e.g., polyethylene terephathalte. In another embodiment, the invention includes composition that is a reaction product of (i) a multifunctional additive containing at least one epoxy group and (ii) polybutylene terephathalate. In another embodiment, the invention includes a composition that includes a reaction product of (i) a multifunctional additive containing at least one epoxy group and (ii) a polyester having at least one acid end group. Ordinarily, at least about 5 wt. % of the gloss-reducing additive initially present reacts with a component of the composition, such as a polyester and/or impact modifier.

Molding parts from this composition under ordinary molding conditions, even against a polished tool, will bring about a molded part having a markedly lower gloss than other compositions and, in fact, a low gloss, when desired.

Molded parts utilizing the composition of this invention include articles such as automotive parts, consumer electronic devices, power tool housings, recreational vehicle parts, power equipment for landscaping and farm use, telecommunication equipment, fitness equipment, and the like.

The most preferred molded parts utilizing the composition of this invention are injection molded parts having a large surface area and/or parts which in ordinary use are viewed in direct light sources, such as daylight, horizon or cool white fluorescence. These light sources could include a UV component, thereby making color and gloss consistency even more important factors. Examples of these molded parts are vehicle parts such as an instrument panel, a horizontal or vertical vehicle body panel, and the like. Additionally, other smaller vehicular trim parts are preferred, for example bezels, knobs, radio panels, heater control panels, exterior housings, wheel well trim, spoiler, and the like. Other molded parts (articles), where low gloss and good mechanical properties are useful include non-automotive parts, such as consumer or electronic devices, power tools, personal fitness equipment, and transportation vehicles, e.g., motorcycles, carts, trucks. With the composition(s) achieving the low gloss number percentage, the molded part achieves an appearance remarkably similar to a painted low gloss part. Therefore, the part molded from this composition does not need to be painted to achieve such appearance. Such non-painted part provides a substantial cost savings, when compared to a part of comparable design, produced by a similar molding process.

One of the differentiating aspects of these compositions is that gloss, particularly low gloss is uniform or at least substantially uniform throughout the surface of the molded part. Uniformity is typically measured visually by a trained observer. Essentially no brighter or duller regions are seen by the trained observer while viewing the molded part surface. Additionally, variation in gloss can be detected by gloss measuring instruments.

Generally, the more PET the lower the gloss. As impact modifier increases, the gloss is reduced. As PC increases, the gloss increases. As PBT is decreased, generally the gloss is reduced. Interestingly, when PET levels are increased, surface gloss is decreased. When PBT levels are decreased, surface gloss is decreased.

As such, a composition of the invention generally has a gloss reducing effective amount of a multifunctional additive comprising at least one epoxy group (also referred to herein as a "gloss reducing agent."). The term "gloss reducing effective amount" generally refers to an amount that is sufficient to reduce gloss by at least about 3%, as determined by a gloss meter (e.g., a BYK Gardner micro-TRI-gloss gloss meter) at any angle, e.g., 60°. In another embodiment, the term "gloss reducing effective amount" refers to an amount that is sufficient to reduce gloss by at least about 5%, or a least less than about 10% or at least less than about 15%. In another embodiment, the term "gloss reducing effective amount" refers to an amount of a gloss reducing agent, which decreases gloss by at least about 20%. The degree to which gloss is reduced can depend on the initial gloss of the plastic article that is being made. Gloss is measured in gloss units.

The absolute gloss value of an article that is achieved by a gloss reduction of at least 3% can vary, depending on the desired application. In one embodiment, as further discussed below, an upper specification limit can be set at 5 gloss units when measured at any angle on a part having a textured surface, such as an interior or exterior automotive part, e.g. an automotive instrument panel. In this instance, any gloss measurement less than 5 gloss units is considered to be low-gloss on a smooth, polished, or textured part when measured at any angle. Other upper specifications can be set, depending on the application.

Gloss is a function of the final roughness of the surface of a molded part. The roughness can be imparted by replicating a rough molding tool surface or be a characteristic of the composition itself, or a combination of the two. Additionally, tool surface roughness and inherent features of the composition can act in combination to produce very low gloss molded articles. Example data provided in this document were measured on parts molded against a polished surface.

The compositions of this invention have distinct advantages over competitive products in the same application area. For example thermoplastic polyolefins have good color and low gloss. However they have poor heat characteristics and mechanical properties. The compositions herein have good color and low gloss but also have good heat and mechanical properties. Examples of heat measurements include HDT and storage modulus. Mechanical properties include tensile modulus, flexural modulus, impact strength, and the like. Rather than painting the surface of the molded part, various pigments can be successfully added to the composition to obtain desired colors. The gloss, particularly low gloss, is uniform or at least substantially uniform over the molded part surface.

Low gloss can be obtained from either a roughened or polished surface of a molding tool. The compositions per se can provide a low gloss surface but gloss can be lowered by other means as well. As previously mentioned, additive(s) can be employed such as an epoxy silane or annealing the molded part will also result in gloss lowering. An example of an additive that will successfully lower gloss is an epoxy silane such as Coat-O-Sil 1770° available from GE. Other multifunctional agents involving an epoxy and/or a silane/siloxane can also be employed. Other means can be employed to lower the gloss than the composition components. Maintaining a relatively moderate heat on the molded part for a period of time, for example a minimum of about 2 minutes, will also bring about a significant gloss reduction. Maintaining a molded part at an elevated temperature such as 85-90° C. for a period of time, post-molding, for example at least about 5 minutes brings about significant gloss reduction.

In one embodiment, the invention relates to a method for reducing gloss that involves heating an article molded molded from a composition that includes (a) about 30 to 80 wt. % of a polycarbonate component, (b) from about 5 to about 50 wt. % of a polyester component, such that when polybutylene terephthalate is present in the composition, the polybutylene terephthalate is used in conjunction with at least one other polyester that is not polybutylene terephthalate, and (c) about 2 to about 25 wt. % of an impact modifier and a gloss reducing effective amount of a multifunctional additive comprising at least one epoxy group. The additional gloss reduction obtained when the article is heated can be at least about 25% or more. In one embodiment, the gloss reduction can be at least about 25%, or from at least about 25% to about 50%, or more. Unexpectedly, gloss can be reduced when the article is subjected to heating for less than 120 minutes, e.g., less than 30 minutes.

The invention is further described in the following illustrative examples in which all parts and percentages are by weight unless otherwise indicated.

EXAMPLES

Following below are various examples and the procedures used to make these examples.

Standards/Procedures

Tool Surface Finish—Where the term "polished surface" is used in this document, this refers to a tool surface that is finished to an SPI-A1 standard. This finish is typically achieved by the use of a #3 diamond buffing procedure. Preparation of the tool surface in this manner achieves a roughness (Ra) parameter range of 0 to 1 nanometers.

Compounding Procedures—All materials were produced by twin-screw extrusion on a 27 mm or 40 mm diameter line. No unusual compounding processes were employed. All solid raw materials were fed to the extruder in the solid, un-melted form. The raw materials could be fed on individual feeders or as a part of a blend. Blends are then fed on a blend feeder. When liquid additives were a part of the formulation, these were added to the blend and fed on the blend feeder. No pumping of liquids was employed in these experiments. The screw speed and master feed rates employed did not impart excessive specific mechanical energy to the materials during extrusion. Compounding was not considered a vital parameter that could change the outcome in these experiments.

Operational Procedures Used During Molding—Parts were molded on a 85-ton Van Dorn press using small tool inserts, having one or two part cavities. Parts were made using a range of barrel and tool temperature settings. The barrel temperatures were varied from about 274° C. to 302° C. The water set point for the cooler attached to the tool was varied from about 32° C. to about 100° C. Specific details of each experiment are given below.

Oven Treatment Procedures—Some specimens were evaluated after being placed in an oven at 85° C. for a short period of time, such as 5, 10, or 15 minutes. If the initial 20° gloss was greater than about 20 gloss units after molding, this oven treatment lowered the gloss of many specimens by an order of magnitude. This was dependent on molding composition. Typical 20° gloss unit values on polished surfaces dropped from 80 to 8 gloss units or less. This effect was present but less noticeable on textured or stipple surfaces. For this study, no temperatures lower than 85° C. were evaluated. Some molding compositions, such as those containing no PBT, produced gloss values below 5 gloss units at 20°, thus requiring no post-molding oven treatment to achieve that level of gloss.

changes in gloss. As gloss approaches 0 gloss units, the gloss meter will become incapable of distinguishing gloss changes at any angle.

Gloss Targets and Specifications—At times an upper specification limit can be set at 5 gloss units when measured at 60° on a part having a textured surface, such as an automotive instrument panel. In this instance, any gloss measurement less than 5 gloss units is considered to be low-gloss If this same part is painted with low gloss paint, the gloss is frequently measured to be in the range of 2 gloss units to 3 gloss units. Therefore, a target gloss value is about 2.5 gloss units at 60° measurement angle on this textured surface. Reducing the gloss on polished or textured surfaces improves the overall perception of gloss and color consistency across molded parts.

Molding Composition/Results

Examples 1 to 14

The effects of impact modifier, polyester, and epoxy silane on the gloss and viscosity. Examples 1-3

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Example Molding Compositions | | | | | | | | | | | | | | |
| PC | 62.56 | 62.56 | 62.56 | 63.06 | 63.06 | 63.06 | 62.56 | 63.06 | 62.96 | 61.06 | 68.56 | 53.56 | 63.06 | 62.56 |
| PET | 18.16 | 18.16 | 18.16 | 18.16 | 18.16 | 18.16 | | | 18.16 | 18.16 | 18.16 | 18.16 | 18.16 | 18.16 |
| PBT | | | | | | | 18.16 | 18.16 | | | | | | |
| ABS1 | 11.00 | | | 11.00 | | | 11.00 | 11.00 | 11.00 | 11.00 | 5.00 | 20.00 | | |
| MBS | | 11.00 | | | 11.00 | | | | | | | | | |
| METABLEN | | | 11.00 | | | 11.00 | | | | | | | | |
| ABS2 | | | | | | | | | | | | | 11.00 | 11.00 |
| CS1770 | 0.50 | 0.50 | 0.50 | 0.00 | 0.00 | 0.00 | 0.50 | 0.00 | 0.10 | 2.00 | 0.50 | 0.50 | 0.00 | 0.50 |
| Adds | 4.76 | 4.76 | 4.76 | 4.76 | 4.76 | 4.76 | 4.76 | 4.76 | 4.76 | 4.76 | 4.76 | 4.76 | 4.76 | 4.76 |
| Acid | 0.02 | 0.02 | 0.02 | 0.02 | 0.02 | 0.02 | 0.02 | 0.02 | 0.02 | 0.02 | 0.02 | 0.02 | 0.02 | 0.02 |
| Talc | 3.00 | 3.00 | 3.00 | 3.00 | 3.00 | 3.00 | 3.00 | 3.00 | 3.00 | 3.00 | 3.00 | 3.00 | 3.00 | 3.00 |
| | 100.0 | 100.0 | 100.0 | 100.0 | 100.0 | 100.0 | 100.0 | 100.0 | 100.0 | 100.0 | 100.0 | 100.0 | 100.0 | 100.0 |
| Measured Responses | | | | | | | | | | | | | | |
| Viscosity | 465 | 390 | 329 | 390 | 387 | 353 | 381 | 315 | 410 | 707 | 460 | 538 | 397 | 469 |
| Gloss 20 | 4.2 | 14.6 | 3.7 | 7.5 | 32.6 | 9.6 | 5.8 | 14.9 | 4.6 | 3.2 | 10.2 | 2.3 | 4.3 | 2.1 |
| Gloss 60 | 34.6 | 60.2 | 37.5 | 52.4 | 79.2 | 56.8 | 37.4 | 63.5 | 40.6 | 24.3 | 59.2 | 16.9 | 38.9 | 16.7 |

Measurement of Responses—Gloss measurements were taken using a BYK Gardner micro-TRI-gloss portable gloss meter on a 2 inch×3 inch molded chip. The surface of the tool was polished to the SPI A1 standard finish. The gloss meter is designed to make measurements that comply with the ASTM D 523 and ISO 2813. Prior to each measurement, the gloss meter calibration was verified, using the dark calibration standard that is included in the meter storage case. Verification is completed at 20°, 60°, and 85° incident angles. The incident angle of measurement was selected to maximize the sensitivity of the gauge. For polished surfaces, a 20° or 60° angle can be used. If textured or stipple surfaces, a 60° or 85° angle can be chosen. This is consistent with known relationships between surface roughness and angle of measurement.

The general trend of lower gloss with increasing surface roughness predicts that at high levels of roughness, large incident angles are needed to retain sufficient gauge sensitivity. Choosing an angle that is too small will result in a gauge that is not capable of measuring small changes in gloss. In a related way, if the surface roughness is low, smaller incident angles must be used to make the gauge sensitive to small In the examples above (numbers 1 through 14) and those below (numbers 15 through 17), the following descriptions and definitions apply to the raw materials used in each molding composition. PC refers to LEXAN polycarbonate ML8199 from General Electric. PET refers to polyethylene terephthalate 8396 from Invista. PBT refers to polybutylene terephtalate 195 from General Electric. ABS1 is an acrylonitrile butadiene styrene polymer and refers to Blendex 362 from Crompton. METABLEN refers to METABLEN S2001 from Mitsubishi Rayon. ABS2 is an acrylonitrile butadiene styrene polymer and refers to Blendex 338 from Crompton. CS1770 is Beta-(3,4-Epoxycyclohexyl)ethyltriethoxysilane and refers to Coat-O-Sil 1770 from General Electric. "Adds" refers to typical heat stabilizers and pigments used in polymer formulations. Acid refers to a solution of 45% phosphorous acid in water that is added as a catalyst quencher to prevent the trans-esterification of polycarbonate and the polyesters. Other examples of quenchers include phosphoric acid, transition metal phosphates, and other non-acidic species. The effective quantities of quenching agents are well known in the literature. Talc refers to Ultratalc 609 from Specialty Minerals Inc that is added as a nucleant for the polyester resins. The responses measured for each molding composition are as follow. Viscosity refers to the melt viscosity (measured at 271° C. and 640 s$^{-1}$), following the ISO11443 standard method. Gloss is measured at 20° and 60° using a handheld BYK Gardner micro gloss meter.

The interpretation of these data should be made with both viscosity and gloss goals in mind. Often, the commercially useful molding composition will be one that has both low gloss and low viscosity. Examples 1, 2 and 3 show the effect of various impact modifiers on gloss and viscosity. Examples 4, 5 and 6 show the effect of removing the gloss reducing agent. Examples 7 and 8 show that a PBT containing composition can have its gloss substantially reduced by an additive. Examples 9 and 10 show the effect of increasing the quantity of the gloss reducing agent. Example 10 shows a substantially lower gloss, but at a higher viscosity. The viscosity of example 10 makes this composition unsuitable for injection molding of large part, such as a vehicular instrument panel. However, a smaller or less intricate part molded from the composition of example 10 would have the benefit of very low gloss. Examples 11 and 12 show the effect of increasing impact modifier, particularly on gloss. Examples 13 and 14 show that another ABS impact modifier can be used to achieve low gloss.

Examples 15, 16, and 17

The effect of Coat-O-Sil 1770 epoxy silane and post molding oven treatment of a single molding composition after the compositions were heated for different periods.

Molding compositions 15, 16 and 17 were extruded and molded. These molding compositions differ only in the amount of Coat-O-Sil 1770 present. As the Coat-O-Sil 1770 is increased from 0 to 1.0%, the PC content is lowered to maintain a molding composition total of 100%. PBT, PET and ABS1 are the same as in table 1. PC2 refers to a bisphenol-A polycarbonate having a higher molecular weight than PC1 from table 1. In all other respects, PC2 and PC1 are similar.

After extrusion, color chips were molded and gloss was measured at 20° on the polished side of the chip. These chips were then placed in an oven at 85° C. for varying periods of time. The shortest time period was 15 minutes. The longest time period was 120 minutes.

As the data in Table 2 show, the initial and final gloss values are reduced as Coat-O-Sil 1770 is added to a formulation. The degree of reduction is dependent on the amount of Coat-O-Sil added. In addition, the rate of decrease with oven treatment may change with Coat-O-Sil 1770 level. Also these data show that molding compositions containing both PBT and PET along with a reduced level of ABS can achieve low gloss surfaces when a post molding oven treatment is employed.

TABLE 2

Components/measured gloss values of molding compositions 15, 16, and 17 discussed in the text.

| Raw Material | 15 | 16 | 17 |
|---|---|---|---|
| PC2 | 50.00 | 49.50 | 49.00 |
| PBT | 20.00 | 20.00 | 20.00 |
| PET | 18.75 | 18.75 | 18.75 |
| ABS1 | 8.75 | 8.75 | 8.75 |
| Stabilizers and Pigments | 2.50 | 2.50 | 2.50 |
| CS1770 | 0.00 | 0.50 | 1.00 |
| Totals | 100.00 | 100.00 | 100.00 |
| Minutes at 85 C. | 20° Gloss | 20° Gloss | 20° Gloss |
| 0 | 54.4 | 35.0 | 29.2 |
| 15 | 16.5 | 10.0 | 6.6 |
| 30 | 14.9 | 8.8 | 5.9 |
| 60 | 14.9 | 9.6 | 5.5 |
| 120 | 14.2 | 6.8 | 5.7 |

Examples 18 to 20

The gloss effect of different reagents in a single formulation were assessed. These formulations differ only in the kind of gloss additive present.

All additives in table 3 were present in the formulation at the 0.5 wt. % level.

TABLE 3

20° gloss measurements from samples with different gloss additives

| Trade name | Additive Functionality | Chemical Name | PET (IV = .54) Gloss (20°) | PET (IV = .73) Gloss (20°) |
|---|---|---|---|---|
| CoatoSil 1770 | Multifunctional with one epoxy group | Beta-(3,4-Epoxycyclohexyl)ethyltriethoxysilane | 3.5 | 4.3 |
| Silquest A-186 | Multifunctional with one epoxy group | Beta-(3,4-Epoxycyclohexyl)ethyltrimethoxysilane | 2.8 | 3.3 |
| Silquest Y-15589 | Multifunctional with one epoxy group | 3-Glycidoxypropyltriethoxysilane | 3.4 | 7.1 |
| ERL 4221 | Bifunctional with two epoxy groups | 3,4-Epoxycyclohexylmethyl-3,4-epoxycyclohexanecarboxylate | 6.8 | 5.8 |
| AOE X68 | Monofunctional with one epoxy group | Alpha-olephin epoxide C16-18 | 11.4 | 9.2 |
| n-OTEOS | Monofunctional | n-octadecyltriethoxysilane | 12.2 | 9.2 |
| None | containing no epoxy groups No additive | None (Control Sample) | 6.2 | 6.8 |

The data in Table 3 show that multifunctional agents significantly reduce gloss in comparison to bifunctional or mono-functional agents. The data show that the mono-functional agents impart a significantly higher relative to the control sample (no additive). The gloss unit measurements were of parts having smooth (A1) surfaces.

TABLE 4

Examples of Compositions Containing LOTADER AX8900 Resin.

| | | | Example | | |
|---|---|---|---|---|---|
| | | | 18 | 19 | 20 |
| High Flow PC | | | 57.74 | 46.73 | 46.35 |
| PET Low IV | | | 22.02 | 18.54 | 18.42 |
| 20% LOTADER/80% PC VHRG | | | 15.00 | 15.00 | 15.00 |
| MBS | | | | 15.00 | 15.00 |
| Additives | | | 1.71 | 1.71 | 1.71 |
| Talc | | | 3.00 | 3.00 | 3.00 |
| CS1770 | | | 0.50 | | 0.50 |
| Acid | | | 0.02 | 0.02 | 0.02 |
| SUM | | | 100.00 | 100.00 | 100.00 |
| Gloss | | | | | |
| 20 degrees gloss | | | 4.5 | 6 | 6.50 |
| 60 degrees gloss | | | 35.0 | 41.2 | 42.20 |
| Notched IZOD | | | | | |
| 23° C. | Ductility | % | 0.00 | 100 | 100 |
| | Impact Strength | J/M | 146 | 633 | 648 |
| −10° C. | Ductility | % | | 100 | 100 |
| | Impact Strength | J/M | | 456 | 420 |
| −20° C. | Ductility | % | 0.00 | 0 | 60 |
| | Impact Strength | J/M | 101 | 307 | 377 |
| −30° C. | Ductility | % | 0.00 | | |
| | Impact Strength | J/M | 89.5 | | |
| Multi-Axial Impact | | | | | |
| 23° C. | Ductility | % | 60 | 100 | 100 |
| | Total Energy | J | 57.1 | 48.3 | 48.7 |
| −20° C. | Ductility | % | 0 | 40 | 80 |
| | Total Energy | J | 65.4 | 49.3 | 54.9 |

LOTADER as used in the examples of table 4 is a blend containing 80 wt. % BPA-polycarbonate and 20 wt % LOTADER AX8900 resin, which is a terpolymer of ethylene, GMA, and methyl acrylate.

The results of example 18 in Table 4 show that molding compositions containing LOTADER alone do provide lower gloss, but exhibit relatively low impact properties. When MBS is added to a LOTADER containing composition, the results of Example 19 in Table 4 show that LOTADER positively affects gloss reduction in the presence of an MBS impact modifier, when compared to the results of example 5 of Table 1.

The results of example 20 in Table 4 show that the additional of 0.5 wt % Coat-O-Sil 1770 does not bring about further gloss reduction in the tested formulation.

Example 21 (Comparative Example)

In this Example, the procedure of Example 1 was followed, except that the following composition (in which the only polyester present is polybutylene terephthalate), was evaluated for its gloss characteristics. This composition has been sold by General Electric Company, through its Plastics component, under the VALOX trade name, for several years.

The "Gloss Targets and Specifications" described above were selected for this Example, where a gloss measurement less than 5 gloss units is considered to be low-gloss. The samples that were tested were molded against an A1 (or smooth) surface. Table 5 shows the components of the composition:

TABLE 5

| LEXAN Polycarbonate | 34.19 |
|---|---|
| Polybutylene terephthalate | 37.95 |
| Heat Stabilizer SEENOX 412S pentaerythritol betalaurylthiopropionate | 0.40 |
| Processing Aid ETHYLENE VINYL ACETATE ELVAX 350 | 2.00 |
| MBS PELLETS, IMPACT MODIFIER | 8.00 |
| Heat Stabilizer Irganox 1010 | 0.06 |
| Halogenated flame retardant additive | 14.30 |
| UV-Stabilizer | 0.25 |
| Mold Release Additive | 0.30 |
| PHOSPHITE STABILIZER | 0.20 |
| Processing Aid | 0.20 |
| Heat Stabilizer | 0.15 |
| LOTADER AX8900 GMA resin | 2.00 |
| Total | 100.00 |
| Gloss measured on a polished A1 surface | |
| 20 degree angle | 63 gloss units |
| 60 degree angle | 93 gloss units |

As can be seen in Table 5, a polyester containing formulation, wherein the only polyester present is polybutylene terephthalate, produces a surface that had a gloss value of 63 gloss units at 20° measurement angle and a gloss value of 93 gloss units at 60° measurement angle, significantly above the less than 5 gloss units low gloss specification.

What is claimed:

1. A composition consisting essentially of, based on the total weight of the composition:
   a) from about 30 to 80 wt. % of a polycarbonate component,
   b) from about 5 to about 50 wt. % of a polyester component, wherein when polybutylene terephthalate is present in the composition, the polybutylene terephthalate is present in conjunction with at least one other polyester that is not polybutylene terephthalate;
   c) about 2 to about 25 wt. % of an impact modifier;
   d) from at least about 0.1 wt. % to less than about 5.0 wt. % of a multifunctional additive compound comprising a silane and an epoxy group; and optionally
   e) an additive selected from the group consisting of a stabilizer, a pigment, a nucleant, a catalyst quencher, and combinations thereof;
   wherein an epoxy functionalized polymer is not present,
   wherein the viscosity of the composition is less than about 500 Pa-s at 271° C. and 640 s$^{-1}$ as measured by capillary rheometry following the ISO 11443 standard, and
   wherein an unpainted part molded from the composition has a surface molded against a polished surface with a gloss below about 5 gloss units when measured at 20° incident angle using a gloss meter, and the gloss is at least substantially uniform over the part surface.

2. The composition in accordance with claim 1, wherein the polycarbonate is present in an amount from about 45 to 75 wt. %, the polyester is present in an amount from about 10 to about 45 wt. %, and the impact modifier is present in an amount from about 4 to about 20 wt. %.

3. The composition in accordance with claim 1, wherein the multifunctional additive compound is selected from the group consisting of trimethoxy silanes, triethoxy silanes, and combinations thereof.

4. The composition in accordance with claim 3, wherein the multifunctional additive compound is selected from the group consisting of beta-(3,4 epoxycyclohexyl)ethyltriethoxysilane, beta-(3,4-epoxycyclohexyl)ethyltrimethoxysilane, 3-glycidoxypropyltriethoxysilane, and combinations thereof.

5. A part molded from the composition of claim 1, said part being unpainted and having a polished surface where gloss has been reduced from the original gloss after molding by at least about 80% by holding the part at 85 to 90° C. for at least about 2 minutes, wherein said gloss is at least substantially uniform over the part surface.

6. A part molded from the composition of claim 1, wherein the part is unpainted and has a textured surface with a gloss below about 10 gloss units, when measured at 60° incident angle, using a gloss meter, wherein gloss is at least substantially uniform over the part surface.

7. The composition of claim 1, wherein the impact modifier is selected from the group consisting of a styrene-acrylonitrile grafted polybutadiene, a styrene-acrylonitrile grafted polybutadiene wherein the grafted polybutadiene also contains methyl methacrylate as a part of the graft, a methyl methacrylate-butadiene-styrene, and a copolymer of methyl methacrylate, butyl acrylate, and dimethylsiloxane.

8. An article molded from the composition of claim 1.

9. The article of claim 8, wherein the article has a large surface area and/or which in ordinary use is viewed in direct light sources comprising daylight, horizon, or cool white fluorescence.

10. The article of claim 8, wherein the article is a an automotive part, a consumer electronic device, a power tool housing, a recreational vehicle part, power equipment for landscaping and farm use, telecommunication equipment, or fitness equipment.

11. The article of claim 8, wherein the article is a vehicular instrument panel, a horizontal or vertical vehicle body panel, a bezel, a knob, a radio panel, a heater control panel, an exterior housing, a wheel well trim, or a spoiler.

12. The article of claim 8, wherein the article is an interior vehicular trim part or an exterior vehicular trim part.

13. The article of claim 8, wherein the polycarbonate is present in an amount from about 45 to 75 wt. %, the polyester is present in an amount from about 10 to about 45 wt. %, and the impact modifier is present in an amount from about 4 to about 20 wt. %.

14. The article of claim 8, wherein the multifunctional additive compound is selected from the group consisting of trimethoxy silanes, triethoxy silanes, and combinations thereof.

15. The article of claim 8, wherein the multifunctional additive compound is selected from the group consisting of beta-(3,4-epoxycyclohexyl) ethyltriethoxysilane, beta-(3,4-epoxycyclohexyl)ethyltrimethoxysilane, 3-glycidoxypropyltriethoxysilane, and combinations thereof.

16. The article of claim 8, wherein the impact modifier is selected from the group consisting of a styrene-acrylonitrile grafted polybutadiene, a styrene-acrylonitrile grafted polybutadiene wherein the grafted polybutadiene also contains methyl methacrylate as a part of the graft, methyl methacrylate-butadiene-styrene, and a copolymer of methyl methacrylate, butyl acrylate, and dimethylsiloxane.

17. The article of claim 8, wherein the composition comprises a quenching reagent.

18. The article of claim 8, wherein the quenching reagent is selected from the group consisting of phosphorous acid, phosphoric acid, and transition metal phosphates.

19. The article of claim 8, wherein the polyester is polyethylene terephthalate.

20. The article of claim 8, wherein the polyester comprises a polybutylene terephthalate and a non-polybutylene terephthalate polyester, wherein the polybutylene terephthalate and non-polybutylene terephthalate polyester have a weight ratio from 9:1 to 1:9.

21. The article of claim 8, wherein the polyester comprises polyethylene terephthalate, and the composition further comprises a reaction product of (i) the multifunctional additive compound containing a silane and an epoxy group and (ii) the polyethylene terephthalate.

22. The article of claim 8, wherein the polyester comprises polybutylene terephthalate, and the composition comprises a reaction product of (i) the multifunctional additive compound containing a silane and an epoxy group and (ii) the polybutylene terephthalate.

23. The article of claim 8, wherein the composition comprises a reaction product of (i) the multifunctional additive compound comprising a silane and an epoxy group and (ii) a polyester having at least one acid end group.

24. The article of claim 8, wherein the article has a gloss that is reduced by at least about 20% compared to an article formed from the same composition in which the multifunctional additive compound comprising a silane and an epoxy group is absent.

25. The article of claim 8, wherein the gloss is measured on a surface molded against a polished surface.

26. The article of claim 8, wherein the gloss is measured on a textured surface.

27. The article of claim 8, wherein the gloss measured on a surface molded against a polished surface is below about 7 gloss units when measured at a 20° incident angle.

28. The article of claim 8, wherein the gloss measured on a textured surface is below about 10 gloss units when measured at a 60° incident angle.

29. The composition in accordance with claim 1, wherein the polyester is polyethylene terephthalate.

30. The composition of claim 1 wherein the polyester comprises a polybutylene terephthalate and a non-polybutylene terephthalate polyester, wherein the polybutylene terephthalate and non-polybutylene terephthalate polyester have a weight ratio from 9:1 to 1:9.

31. A process wherein (a), (b), (c), and (d) of claim 1 are combined under reactive conditions.

32. The composition of claim 1, wherein the polyester comprises polyethylene terephthalate, and the composition further comprises a reaction product of (i) the multifunctional additive compound containing a silane and an epoxy group and (ii) the polyethylene terephthalate.

33. The composition of claim 1, wherein the polyester comprises polybutylene terephthalate, and the composition comprises a reaction product of (i) the multifunctional additive compound containing a silane and an epoxy group and (ii) the polybutylene terephthalate.

34. The composition of claim 1, comprising a reaction product of (i) the multifunctional additive compound comprising a silane and an epoxy group and (ii) a polyester having at least one acid end group.

35. A method for reducing gloss comprising heating an article molded from the composition of claim 1, and thereby further reducing the gloss of the molded article.

36. The method of claim 35, wherein the article is subjected to heating for less than 30 minutes.

37. The composition of claim 1, wherein the at least one polyester that is not polybutylene terephthalate is polyethylene terephthalate.

38. The composition of claim 1, wherein the polyester component is selected from the group consisting of poly (ethylene terephthalate), poly(1,4-butylene terephthalate), poly(ethylene naphthanoate), poly(butylene naphthanoate), poly(cyclohexanedimethylene terephthalate), polycyclohexylenedimethylene ethylene terephthalate, polypropylene terephthalate, and mixtures thereof.

39. A method for forming an article having low gloss comprising molding the composition of claim 1.

40. The method of claim 39, wherein the polycarbonate is present in an amount from about 45 to 75 wt. %, the polyester is present in an amount from about 10 to about 45 wt. %, and the impact modifier is present in an amount from about 4 to about 20 wt. %.

41. The method of claim 39, wherein the multifunctional additive is selected from the group consisting of trimethoxy silanes, triethoxy silanes, and combinations thereof.

42. The method of claim 39, wherein the multifunctional additive is selected from the group consisting of beta-(3,4-epoxycyclohexyl)ethyltriethoxysilane, beta-(3,4-epoxycyclohexyl)ethyltrimethoxysilane, 3-glycidoxypropyltriethoxysilane, and combinations thereof.

43. The method of claim 39, wherein the impact modifier is selected from the group consisting of a styrene-acrylonitrile grafted polybutadiene, a styrene-acrylonitrile grafted polybutadiene wherein the grafted polybutadiene also contains methyl methacrylate as a part of the graft, methyl methacrylate-butadiene-styrene, and a copolymer of methyl methacrylate, butyl acrylate, and dimethylsiloxane.

44. The method of claim 39, wherein the composition comprises a quenching reagent.

45. The method of claim 44, wherein the quenching reagent is selected from the group consisting of phosphorous acid, phosphoric acid, and transition metal phosphates.

46. The method of claim 39, wherein the polyester is polyethylene terepthalate.

47. The method of claim 39, wherein the polyester comprises a polybutylene terephthalate and a non-polybutylene terephthalate polyester, wherein the polybutylene terephthalate and non-polybutylene terephthalate polyester have a weight ratio from 9:1 to 1:9.

48. The method of claim 39, wherein the polyester comprises polyethylene terephthalate, and the composition further comprises a reaction product of (i) the multifunctional additive containing a silane and an epoxy group and (ii) the polyethylene terephthalate.

49. The method of claim 39, wherein the polyester comprises polybutylene terephthalate, and the composition comprises a reaction product of (i) the multifunctional additive containing a silane and an epoxy group and (ii) the polybutylene terephthalate.

50. The method of claim 39, wherein the composition comprises a reaction product of (i) the multifunctional additive comprising a silane and an epoxy group and (ii) a polyester having at least one acid end group.

51. The method of claim 39, wherein the article has a gloss that is reduced by at least about 20% compared to an article formed from the same composition in which the multifunctional additive comprising a silane and an epoxy group is absent.

52. The method of claim 39, wherein the gloss is measured on a surface molded against a polished surface.

53. The method of claim 39, wherein the gloss is measured on a textured surface.

54. The method of claim 39, wherein the gloss measured on a surface molded against a polished surface is below about 7 gloss units when measured at a 20° incident angle.

55. The method of claim 39, wherein the gloss measured on a textured surface is below about 10 gloss units when measured at a 60° incident angle.

56. A part molded from the composition of claim 1, wherein the part is unpainted and has a surface molded against a polished surface with a gloss below about 5 gloss units, when measured at 20° incident angle, using a gloss meter, wherein said gloss is at least substantially uniform over the part surface.

57. A composition consisting essentially of:
a) from about 45 to 75 wt. % of a polycarbonate component;
b) from about 10 to about 45 wt. % of a polyester component, wherein when polybutylene terephthalate is present in the composition, the polybutylene terephthalate is present in conjunction with at least one other polyester that is not polybutylene terephthalate;
c) from about 4 to about 20 wt. % of an impact modifier; and
d) a multifunctional additive compound selected from the group consisting of beta-(3,4-epoxycyclohexyl)ethyltriethoxysilane, beta-(3,4-epoxycyclohexyl)ethyltrimethoxysilane, 3-glycidoxypropyltriethoxysilane, and combinations thereof in an amount of greater than about 0.1 wt. %; and optionally
e) an additive selected from the group consisting of a stabilizer, a pigment, a nucleant, a catalyst quencher, and combinations thereof;
wherein an epoxy functionalized polymer is not present, and
wherein an unpainted part molded from the composition has a polished surface with a gloss below about 5 gloss units when measured at 20° incident angle using a gloss meter, and the gloss is at least substantially uniform over the part surface.

58. The composition of claim 57, wherein the viscosity of the composition is less than about 500 Pa-s at 271° C. and 640 s$^{-1}$ as measured by capillary rheometry following the ISO 11443 standard.

* * * * *